United States Patent
Namkung et al.

(10) Patent No.: US 8,173,048 B2
(45) Date of Patent: May 8, 2012

(54) COMPOSITION FOR CIRCUIT CONNECTION FILM AND CIRCUIT CONNECTION FILM USING THE SAME

(75) Inventors: Hyun Hee Namkung, Uiwang-si (KR); Kyoung Soo Park, Uiwang-si (KR); Bong Yong Kim, Uiwang-si (KR); Kang Bae Yoon, Uiwang-si (KR); Sang Sik Bae, Uiwang-si (KR); Hyun Joo Seo, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 335 days.

(21) Appl. No.: 12/654,122

(22) Filed: Dec. 10, 2009

(65) Prior Publication Data

US 2010/0148130 A1     Jun. 17, 2010

(30) Foreign Application Priority Data

Dec. 11, 2008  (KR) ................. 10-2008-0126167

(51) Int. Cl.
*H01B 1/04* (2006.01)
*H01B 1/02* (2006.01)
*H01B 1/22* (2006.01)
*C08F 26/02* (2006.01)
*C08G 65/32* (2006.01)

(52) U.S. Cl. ........ 252/502; 252/513; 252/514; 525/408; 526/301

(58) Field of Classification Search ................. 252/502, 252/513, 514; 525/408; 526/301
See application file for complete search history.

(56) References Cited

U.S. PATENT DOCUMENTS 5,624,759 A * 4/1997 Usifer et al. ............... 428/424.2
2006/0060824 A1 * 3/2006 Yasumura et al. ........... 252/500

* cited by examiner

*Primary Examiner* — Mark Kopec
*Assistant Examiner* — Jaison Thomas
(74) *Attorney, Agent, or Firm* — Lee & Morse, P.C.

(57) ABSTRACT

A composition for a circuit connection film and a circuit connection film using the same, the composition including a binder resin including an acrylate modified urethane resin, a carboxyl modified acrylonitrile butadiene rubber, and an acrylic copolymer, the acrylic copolymer having an acid value of about 1 to about 100 mg KOH/g, a radical polymerizable compound including at least one of an isocyanurate acrylate compound and a compound having a (meth)acrylate group, and an organic peroxide.

16 Claims, No Drawings

COMPOSITION FOR CIRCUIT CONNECTION FILM AND CIRCUIT CONNECTION FILM USING THE SAME

BACKGROUND

1. Field

Embodiments relate to a composition for a circuit connection film and a circuit connection film using the same.

2. Description of the Related Art

Circuit connection films generally refer to an adhesive film in which conductive particles, e.g., metal particles of Ni or Au and polymer particles coated with such metal, are dispersed. When the adhesive film is disposed between circuits to be bonded and subjected to heating and pressing under certain conditions, circuit terminals may be electrically connected by the conductive particles. A pitch between adjacent circuits may be filled with an insulating adhesive resin, so that the conductive particles are independently present therein, thereby providing strong insulation. Such circuit connection films are widely employed for, e.g., electrical connection between an LCD panel and a tape carrier package (TCP) or between a printed circuit board (PCB) and a TCP.

However, with recent trends towards larger scale and narrower frame of display devices, a pitch between electrodes and circuits has become finer. Accordingly, a circuit connection film may serve as a significant wiring instrument for connecting fine circuits. As a result, circuit connection films have attracted attention as a connection material in chip-on-glass (COG) or chip-on-film (COF) mounting.

A typical circuit connection film may include, e.g., an epoxy type circuit connection film or a (meth)acrylate type circuit connection film. The epoxy type circuit connection film may be formed by mixing a binder resin, functioning as a matrix in formation of a film, with a curing agent of an epoxy or phenol resin and a curing material. The (meth)acrylate type circuit connection film may be formed by mixing a binder resin with a curing agent of a (meth)acrylic oligomer, a (meth)acrylic monomer and a radical initiator.

SUMMARY

Embodiments are directed to a composition for a circuit connection film and a circuit connection film using the same, which substantially overcome one or more of the problems due to the limitations and disadvantages of the related art.

It is a feature of an embodiment to provide a composition for a circuit connection film that permits easy control of fluidity and curability, thereby preventing a decrease in resin exclusion from a space between upper and lower electrodes even in a fine terminal.

It is another feature of an embodiment to provide a composition for a circuit connection film which has improved curability and is applicable to a low-temperature connection process.

At least one of the above and other features and advantages may be realized by providing a composition for a circuit connection film including a binder resin including an acrylate modified urethane resin, a carboxyl modified acrylonitrile butadiene rubber, and an acrylic copolymer, the acrylic copolymer having an acid value of about 1 to about 100 mg KOH/g, a radical polymerizable compound including at least one of an isocyanurate acrylate compound and a compound having a (meth)acrylate group, and an organic peroxide.

The composition may include 100 parts by weight of the binder resin, the binder resin including about 45 to about 75 wt. % of the acrylate modified urethane resin, about 5 to about 25 wt. % of the carboxyl modified acrylonitrile butadiene rubber, and about 5 to about 30 wt. % of the acrylic copolymer having an acid value of about 1 to about 100 mg KOH/g, all based on the weight of the binder resin, about 18 to about 32 parts by weight of the radical polymerizable compound including at least one of the isocyanurate acrylate compound and the compound with a (meth)acrylate group; and about 1.5 to about 15 parts by weight of the organic peroxide.

The radical polymerizable compound may include the isocyanurate acrylate compound and the compound with a (meth)acrylate group, a weight ratio of the isocyanurate acrylate compound to the compound with a (meth)acrylate group being about 1:2 to about 2:1.

The acrylate modified urethane resin may include a diisocyanate, a polyol, a diol and an acrylate, a mole ratio of a diisocyanate group (NCO) to a hydroxyl group (OH) among the diisocyanate, polyol, and diol may be about 1.04 to about 1.6, and the acrylate modified urethane resin may have a polyol content of about 70% or less.

The acrylate modified urethane resin may have a weight-average molecular weight of about 1,000 to about 50,000, the acrylate modified urethane resin may have at least one acrylate terminal functional group, and the acrylate modified urethane resin may have a glass transition temperature (Tg) of about 0° C. or higher.

The carboxyl modified acrylonitrile butadiene rubber may have a weight-average molecular weight of about 2,000 to about 200,000, the carboxyl modified acrylonitrile butadiene rubber may have an acrylonitrile content of about 10 to about 60 wt. %, and the carboxyl modified acrylonitrile butadiene rubber may have a carboxyl content of about 1 to about 20 wt. %.

The radical polymerizable compound may include the isocyanurate acrylate compound, the isocyanurate acrylate compound having a DSC heating peak of about 85 to about 95° C.

The isocyanurate acrylate compound may have a DSC heating peak of about 92 to about 95° C.

The isocyanurate acrylate compound may include at least one of isocyanuric acid ethylene oxide modified diacrylate and tris(2-hydroxyethyl)isocyanurate triacrylate.

The radical polymerizable compound may include the compound with a (meth)acrylate group, the compound with a (meth)acrylate group including a (meth)acrylate oligomer and a (meth)acrylate monomer.

The (meth)acrylate oligomer may include at least one of urethane (meth)acrylate, epoxy (meth)acrylate, polyester (meth)acrylate, fluorine (meth)acrylate, fluorene (meth)acrylate, silicon (meth)acrylate, phosphorus (meth)acrylate, maleimide modified (meth)acrylate, and acrylate (methacrylate).

The (meth)acrylate monomer may include at least one of 1,6-hexanediol mono(meth)acrylate, 2-hydroxyethyl (meth)acrylate, 2-hydroxypropyl (meth)acrylate, 2-hydroxybutyl (metha)crylate, 2-hydroxy-3-phenyloxypropyl (meth)acrylate, 1,4-butanediol (meth)acrylate, 2-hydroxyalkyl (meth)acryloyl phosphate, 4-hydroxycyclohexyl (meth)acrylate, neopentylglycol mono(meth)acrylate, trimethylolethane di(meth)acrylate, trimethylolpropane di(meth)acrylate, pentaerythritol tri(meth)acrylate, dipentaerythritol penta(meth)acrylate, pentaerythritol hexa(meth)acrylate, dipentaerythritol hexa(meth)acrylate, glycerol di(meth)acrylate, t-hydrofurfuryl (meth)acrylate, isodecyl (meth)acrylate, 2-(2-ethoxyethoxy)ethyl (meth)acrylate, stearyl (meth)acrylate, lauryl (meth)acrylate, 2-phenoxyethyl (meth)acrylate, isobonyl (meth)acrylate, tridecyl (meth)acrylate, ethoxylated nonylphenol (meth)acrylate, ethyleneglycol di(meth)acrylate, diethyleneglycol di(meth)acrylate, triethyleneglycol di(meth)acrylate, t-ethyleneglycol di(meth)acrylate, polyethyleneglycol di(meth)acrylate, 1,3-butyleneglycol di(meth)acrylate, tripropyleneglycol di(meth)acrylate, ethoxylated bisphenol A di(meth)acrylate, cyclohexanedimethanol di(meth)acrylate, phenoxy-t-glycol (meth)acrylate, 2-methacryloyloxyethyl phosphate, dimethylol tricyclodecane di(meth)acrylate, trimethylol-propanebenzoate acrylate, fluorene (meth)acrylate, and acid phosphoxyethyl methacrylate.

At least one of the (meth)acrylate oligomer and the (meth)acrylate monomer may include at least one of a fluorene epoxy (meth)acrylate and a fluorene urethane (meth)acrylate, the at least one fluorene epoxy (meth)acrylate and fluorene urethane (meth)acrylate having a fluorene structure represented by the following Chemical Formula 1:

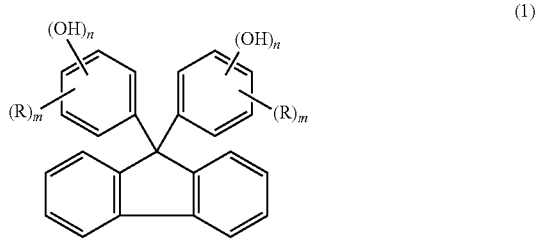

(1)

wherein R is an alkyl, alkoxy, aryl, or cycloalkyl group, m is an integer from 0 to 4, and n is an integer from 2 to 5.

The organic peroxide may include at least one of t-butylperoxylaurate, 1,1,3,3-t-methylbutyl peroxy-2-ethylhexanonate, 2,5-dimethyl-2,5-di(2-ethylhexanoyl peroxy)hexane, 1-cyclohexyl-1-methylethyl peroxy-2-ethylhexanonate, 2,5-dimethyl-2,5-di(m-toluoylperoxy)hexane, t-butyl peroxyisopropylmonocarbonate, t-butyl peroxy-2-ethylhexylmonocarbonate, t-hexyl peroxybenzoate, t-butyl peroxyacetate, dicumyl peroxide, 2,5-dimethyl-2,5-di(t-butylperoxy)hexane, t-butylcumylperoxide, t-hexyl peroxyneodecanoate, t-hexylperoxy-2-ethylhexanonate, t-butylperoxy-2-2-ethylhexanonate, t-butylperoxyisobutyrate, 1,1-bis(t-butylperoxy)cyclohexane, t-hexyl peroxyisopropylmonocarbonate, t-butylperoxy-3,5,5-trimethylhexanonate, t-butylperoxypivalate, cumylperoxy-neodecanoate, diisopropylbenzenehydroperoxide, cumene hydroperoxide, isobutylperoxide, 2,4-dichlorobenzoylperoxide, 3,5,5-trimethylhexanoylperoxide, octanoylperoxide, lauroylperoxide, stearoylperoxide, succinic peroxide, benzoylperoxide, 3,5,5-trimethylhexanoylperoxide, benzoylperoxytoluene, 1,1,3,3-tetramethylbutylperoxyneodecanoate, 1-cyclohexyl-1-methylethylperoxyneodecanoate, di-n-propylperoxydicarbonate, diiso-propylperoxycarbonate, bis(4-t-butylcyclohexyl) peroxydicarbonate, di-2-ethoxymethoxyperoxydicarbonate, di(2-ethylhexylperoxy)dicarbonate, dimethoxy-butylperoxydicarbonate, di(3-methyl-3-methoxybutylperoxy)dicarbonate, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-(t-butylperoxy)cyclododecane, 2,2-bis(t-butylperoxy)decane, t-butyltrimethylsilylperoxide, bis(t-butyl)dimethylsilylperoxide, t-butyltriallylsilylperoxide, bis(t-butyl)diallylsilylperoxide, and tris(t-butyl)allylsilylperoxide.

The composition may further include about 5 to about 13 parts by weight of conductive particles with respect to 100 parts by weight of the binder resin, the conductive particles including at least one of metal particles including at least one of Au, Ag, Ni, Cu, and solder, carbon, and a resin including polyethylene, polypropylene, polyester, polystyrene and polyvinyl alcohol and a modification thereof which are coated with metal including at least one of Au, Ag, and Ni.

At least one of the above and other features and advantages may also be realized by providing a circuit connection film including the composition of an embodiment, the film having a DSC heating peak temperature of about 92 to about 95° C. when measured by a differential scanning calorimeter (DSC) at a temperature range of 50 to 220° C. and a temperature increase rate of 10° C./min, and an acid value of about 5 to about 30 mg KOH/g.

DETAILED DESCRIPTION

Korean Patent Application No. 10-2008-0126167, filed on Dec. 11, 2008, in the Korean Intellectual Property Office, and entitled: "Composition for Circuit Connection Film and Circuit Connection Film Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two element, or one or more intervening elements may also be present. Like reference numerals refer to like elements throughout.

A composition for a circuit connection film according to an embodiment may include, e.g., a binder resin, an organic peroxide, and a radical polymerizable compound including at least one of an isocyanurate acrylate compound and a compound with a (meth)acrylate group.

Binder Resin

The binder resin may include an acrylate modified urethane resin, a carboxyl modified acrylonitrile butadiene rubber, and an acrylic copolymer. The acrylate copolymer may have an acid value of about 1 to about 100 mg KOH/g.

As a component of the binder resin, the acrylate modified urethane resin may have a low glass transition temperature (Tg). Such a low Tg may help ensure that the acrylate modified urethane resin has enhanced fluidity and exhibits high adhesion by a urethane group in molecular chains thereof. In particular, when used in the circuit connection film, curability of the acrylate modified urethane resin may be improved, thereby lowering the temperature of a connecting process. In an implementation, the acrylate modified urethane resin may include a diisocyanate, a polyol, a diol, and an acrylate.

The diisocyanate may include, e.g., an aromatic diisocyanate, an aliphatic diisocyanate, an alicyclic diisocyanate, and mixtures thereof. In an implementation, the diisocyanate may include, e.g., tetramethylene-1,4-diisocyanate, hexamethylene-1,6-diisocyanate, cyclohexylene-1,4-diisocyanate, methylene-bis(4-cyclohexyl diisocyanate), isophorone diisocyanate, and/or 4-4-methylene-bis(cyclohexyl diisocyanate).

The polyol may include a compound having two or more hydroxyl groups in a molecular chain, e.g., a polyester polyol, a polyether polyol, a polycarbonate polyol, etc. The polyol may be formed by, e.g., condensation of a dicarboxylic compound and a diol compound. The dicarboxylic compound may include, e.g., succinic acid, glutaric acid, isophthalic acid, adipic acid, suberic acid, azelaic acid, sebacic acid, dodecanedicarboxylic acid, hexahydrophthalic acid, terephthalic acid, ortho-phthalic acid, tetrachlorophthalic acid, 1,5-naphthalenedicarboxylic acid, fumaric acid, maleic acid, itaconic acid, citraconic acid, mesaconic acid, tetrahydrophthalic acid, etc. The diol compound may include, e.g., ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, 1,4-cyclohexanedimethanol, etc.

The polyether polyol may include, e.g., polyethylene glycol, polypropylene glycol, or polytetraethylene glycol. The polyether polyol may have a weight-average molecular weight of about 400 to about 10,000. Other polyols may have a weight-average molecular weight of about 400 to about 3,000.

The polycarbonate polyol may include, e.g., poly(alkylene carbonate) and/or a silicon derived polycarbonate polyol.

The acrylate may include, e.g., hydroxy acrylate and/or amine acrylate.

The acrylate modified urethane resin including the diisocyanate, polyol, diol, acrylate may be prepared by, e.g., polyaddition, such that a mole ratio of a diisocyanate group (NCO) to a hydroxyl group (OH) among the three ingredients other than acrylate (i.e., diisocyanate, polyol, and diol) may be about 1.04 to about 1.6, and an overall polyol content may be about 70% or less. Then, a reaction may occur between one terminal functional group of the urethane synthesized by the polyaddition, i.e., a diisocyanate group, with the acrylate, e.g., the hydroxyl acrylate and/or amine acrylate at a mole ratio of about 0.1 to about 2.1. Then, a remaining isocyanate group may be subjected to reaction with alcohols, thereby producing an acrylate modified urethane resin. The polyaddition may be carried out by any suitable method known in the art. In an implementation, the reaction may be conducted at a temperature of about 90° C. and a pressure of about 1 atm. for about 5 hours using a tin-based catalyst.

The acrylate modified urethane resin may have a weight-average molecular weight of about 1,000 to about 50,000 and at least one acrylate terminal functional group. The acrylate modified urethane resin may have at least one Tg, e.g., two Tgs, at least one of which may be about 0° C. or higher.

In other words, the acrylate modified urethane resin may have a single Tg of about 0° C. or higher or more than one Tg, at least one Tg being about 0° C. or higher. This may be due to phase mixing of a soft segment, e.g., polyol, and a hard segment, e.g., diisocyanate. Thus, the acrylate modified urethane resin may serve as a binder that forms a film at normal temperature. Further, the acrylate modified urethane resin may be allowed to undergo a curing reaction with acryl groups in a curing agent through an acrylate terminal functional group to further serve as a curing agent, thereby exhibiting good adhesion and high connection reliability.

The acrylate modified urethane resin may be included in the binder resin in an amount of about 45 to about 80% by weight (wt. %). Maintaining the amount at about 45 wt. % or greater may help ensure that the resin permeates a space between electrodes, thereby increasing adhesion. Maintaining the amount at about 80 wt. % or less may help ensure that the resin is not excessively filled between the electrodes, thereby ensuring high connection reliability.

The carboxyl modified acrylonitrile butadiene rubber may increase stability of a resin mixture due to presence of a carboxyl group. Thus, miscibility with other resins and additives may be improved and processability, e.g., coating characteristics or the like, may be facilitated. Further, the carboxyl modified acrylonitrile butadiene rubber may improve adhesion, polarity and other properties, e.g., waterproofing and thermal resistance.

The carboxyl modified acrylonitrile butadiene rubber may have a weight average molecular weight of about 2,000 to about 200,000, an acrylonitrile content of about 10 to about 60 wt. %, and a carboxyl content of about 1 to about 20 wt. %. In an implementation, the carboxyl modified acrylonitrile butadiene rubber may have a weight average molecular weight of about 3,000 to about 200,000 and an acrylonitrile content of about 20 to about 50 wt. %.

Maintaining the weight average molecular weight of the carboxyl modified acrylonitrile butadiene rubber at about 2,000 or greater may help ensure sufficient thermal stability. Maintaining the weight average molecular weight at about 200,000 or less may help ensure satisfactory solubility and viscosity, as well as sufficient processability when the rubber is used in preparing a solution, thus increasing adhesion. Maintaining the acrylonitrile content at about 10 wt. % or greater may help ensure that solubility is not lowered. Maintaining the acrylonitrile content at about 60 wt. % or less may help ensure sufficient electrical insulation properties of the rubber. Maintaining the carboxyl content at about 1 to about 20 wt. % may help ensure that the carboxyl modified acrylonitrile butadiene rubber is easily combined with other resins and additive materials to increase adhesion.

In an implementation, the carboxyl modified acrylonitrile butadiene rubber may include, e.g., N34, 1072, 1072CG (Jeon Ltd.), etc., which are commercially available in the market.

The carboxyl modified acrylonitrile butadiene rubber may be included in the binder resin in an amount of about 5 to about 25 wt. %. Maintaining the amount at about 5 wt. % or greater may help ensure that the composition does not separate into different phases, thus avoiding difficulties in forming a film. Maintaining the amount at about 25 wt. % or less may help ensure that connection reliability is not lowered by elastic properties after the composition is subjected to main pressing.

The acrylic copolymer may be prepared by polymerization of acrylic monomers, e.g., ethyl, methyl, propyl, butyl, hexyl, octyl, dodecyl, lauryl acrylate and methacrylate, modifications thereof, e.g., acrylate, acrylic acid, methacrylic acid, methyl methacrylate and vinyl acetate, and modifications thereof, e.g., acrylic monomer.

The acrylic copolymer may essentially contain a hydroxyl or carboxyl group. The acrylic copolymer may have an acid value of about 1 to about 100 mg KOH/g. The acrylic copolymer may further include an epoxy or alkyl group. The acrylic copolymer may have a Tg of about 50 to about 120° C. Maintaining the Tg of the acrylic copolymer at about 50° C. or higher may help ensure that the film does not become soft, thus avoiding inferior compressibility and a decrease in connection reliability with urethane acrylate having a low Tg. Maintaining the Tg at about 120° C. or lower may help ensure that the film does not break and is formed well. Maintaining the acid value of the acrylic copolymer at about 1 mg KOH/g or greater may help ensure that sufficient adhesion is obtained. Maintaining the acid value at about 100 mg KOH/g or less may help ensure that connection reliability is not lowered due to, e.g., corrosion.

In particular, it is preferable that the acrylic copolymer has a Tg of about 90° C. in order to realize a strong film and functions as only a binder with an acid value of about 3.4 mg KOH/g. Since the urethane binder may have a relatively low Tg, the acrylic copolymer, mixed therewith as a binder, may have a higher Tg to bring about favorable connection reliability. However, if the acrylic copolymer has an excessively high Tg, it may be broken in terms of acrylic properties so that a film is not properly formed.

The acrylic copolymer may be included in the binder resin in an amount of about 5 to about 30 wt. %. Maintaining the amount at about 5 wt. % or greater may help ensure that the film does not become soft, ensuring good re-workability after being pressurized in a pressing process. Maintaining the amount at about 30 wt. % or less may help ensure that the film does not lose adhesion, thus avoiding undesirably coming loose when pressurized.

Radical Polymerizable Compound

The radical polymerizable compound may include at least one of an isocyanurate acrylate compound and a compound with a (meth)acrylate group.

The isocyanurate acrylate (isocyanuric acid acrylate) may, e.g., give high adhesion and connection reliability to the composition or a circuit connection film, even in a low-temperature connection. The isocyanurate acrylate may include, e.g., isocyanuric acid ethylene oxide modified diacrylate, tris(2-hydroxyethyl)isocyanurate triacrylate, etc. In an implementation, isocyanuric acid ethylene oxide modified diacrylate may be used.

The isocyanurate acrylate may exhibit a differential scanning calorimeter (DSC) heating peak obtained from a DSC graph. To measure a DSC heating peak, a composition for a circuit connection film including 49 wt. % of a binder resin, 49 wt. % radical polymerizable compound (e.g., isocyanurate acrylate), and 2 wt. % of an organic peroxide may be prepared and measured using a DSC (Perkin-Elmer Diamond) to obtain the DSC heating peak of the isocyanurate acrylate. In detail, the DSC heating peak may be measured by reading a temperature from a graph plotting an energy (dΔQ/dt) that a sample emits under a temperature range of 50 to 220° C. at a temperature rise rate of 10° C./min.

In an implementation, the isocyanurate acrylate may have a DSC heating peak of about 85 to about 95° C., thus ensuring that the circuit connection film may be sufficiently cured in a short main pressing process. In an implementation, the isocyanurate acrylate may have a DSC heating peak of about 92 to about 95° C. Maintaining the DSC heating peak at about 85° C. or higher may help ensure that the composition for the circuit connection film is not pre-cured, thus ensuring that an electrode is sufficiently pressurized. Maintaining the DSC heating peak at about 95° C. or lower may help ensure that the composition is quickly cured, thus ensuring reliability of contact resistance.

The isocyanurate acrylate may be included in the composition in an amount of about 9 to about 16 parts by weight with respect to 100 parts by weight of the binder resin. Maintaining the amount at about 9 parts by weight or greater may help ensure sufficient connection reliability. Maintaining the amount at about 16 parts by weight or less may help ensure sufficient adhesion.

The compound with a (meth)acrylate group may be a radical polymerizable compound, and may be included as a curing agent to, e.g., ensure adhesion and connection reliability between connection layers as radical curing reaction occurs. The compound with the (meth)acrylate group may include, e.g., a (meth)acrylate oligomer, a (meth)acrylate monomer, etc. In an implementation, the compound with the (meth)acrylate group may include at least one of a (meth)acrylate oligomer and a (meth)acrylate monomer. In another implementation, the compound with the (meth)acrylate group may include a (meth)acrylate oligomer and a (meth)acrylate monomer.

The (meth)acrylate oligomer may include, e.g., urethane (meth)acrylate, epoxy (meth)acrylate, polyester (meth)acrylate, fluorine (meth)acrylate, fluorene (meth)acrylate, silicon (meth)acrylate, phosphorus (meth)acrylate, maleimide modified (meth)acrylate, and/or acrylate (methacrylate). The (meth)acrylate oligomer may have a weight average molecular weight of about 1,000 to about 100,000.

The urethane (meth)acrylate oligomer may include, e.g., a compound with an intermediate structure synthesized from polyester polyol, polyether polyol, polycarbonate polyol, polycaprolactone polyol, a ring-opened tetrahydrofuranepropyleneoxide copolymer, polybutadiene diol, polydimethylsiloxane diol, ethylene glycol, propylene glycol, 1,4-butanediol, 1,5-pentanediol, 1,6-hexanediol, neopentyl glycol, 1,4-cyclohexane dimethanol, bisphenol A, hydrogenated bisphenol A, 2,4-toluene diisocyanate, 1,3-xylene diisocyanate, 1,4-xylene diisocyanate, 1,5-naphthalene diisocyanate, 1,6-hexane diisocyanate, isophorone diisocyanate, and/or bisphenol A propyleneoxide modified diacrylate.

The epoxy (meth)acrylate oligomer may include, e.g., a compound with an intermediate structure of 2-bromohydroquinone, resorcinol, catechol, bisphenol A, bisphenol F, bisphenol AD, bisphenol S, 4,4'-dihydroxybiphenyl or bis(4-hydroxyphenyl)ether, and/or (meth)acrylate oligomers with an alkyl, aryl, methylol, cycloaliphatic, halogen (tetrabromobisphenol A), and/or nitro group.

In an implementation, the (meth)acrylate oligomer may include a compound having at least two maleimide groups, e.g., 1-methyl-2,4-bis(maleimide)benzene, N,N'-m-phenylenebis(maleimide), N,N'-p-phenylenebis(maleimide), N,N'-m-toluoylenebis(maleimide), N,N'-4,4-biphenylenebis(maleimide), N,N'-4,4-(3,3'-dimethylbiphenylene)bis(maleimide), N,N'-4,4-(3,3'-dimethyldiphenylmethane)bis(maleimide), N,N'-4,4-(3,3'-diethyldiphenylmethane)bis(maleimide), N,N'-4,4-diphenylmethanebis(maleimide), N,N'-4,4-diphenylpropanebis(maleimide), N,N'-4,4-diphenyl ether bis(maleimide), N,N'-3,3'-diphenylsulfonebis(maleimide), 2,2-bis[4-(4-maleimidophenoxy)phenyl]propane, 2,2-bis[3-s-butyl-4-8(4-maleimidophenoxy)phenyl]propane, 1,1-bis[4-(4-maleimidophenoxy)phenyl]decane, 4,4'-cyclohexylidene-bis[1-(4-maleimidophenoxy)-2-cyclohexyl]benzene, and/or 2,2-bis[4-(4-maleimidophenoxy)phenyl]hexafluoropropane.

The (meth)acrylate oligomer may be, e.g., a fluorene (meth)acrylate oligomer having a fluorene structure represented by the following Chemical Formula 1. In particular, the (meth)acrylate oligomer may include a fluorene moiety having a structure represented by Chemical Formula 1. The fluorene (meth)acrylate oligomer may include, e.g., a fluorene epoxy (meth)acrylate oligomer, a fluorene urethane (meth)acrylate oligomer, etc.

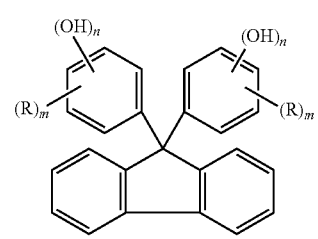

(1)

In the fluorene moiety having the structure represented by Chemical Formula 1, R may be an alkyl, alkoxy, aryl or cycloalkyl group, m may be an integer of 0 to about 4, and n may be an integer of about 2 to about 5. In an implementation, m may be an integer of 0 to about 3. In another implementation, n may be an integer of about 1 to about 5. For example, m may be 0, 1, 2, 3, or 4 and n may be 1, 2, 3, 4, or 5.

If the (meth)acrylate oligomer is a fluorene (meth)acrylate oligomer, excellent insulating properties of the fluorene structure may lead to a decreased possibility of short circuiting. Low initial contact resistance and high reliability may be further secured, thereby improving productivity and reliability of a final product.

The (meth)acrylate monomer may include, e.g., 1,6-hexanediol mono(meth)acrylate, 2-hydroxyethyl (meth)acrylate, 2-hydroxypropyl (meth)acrylate, 2-hydroxybutyl (metha)crylate, 2-hydroxy-3-phenyloxypropyl (meth)acrylate, 1,4-butanediol (meth)acrylate, 2-hydroxyalkyl (meth)acryloyl phosphate, 4-hydroxycyclohexyl (meth)acrylate, neopentylglycol mono(meth)acrylate, trimethylolethane di(meth)acrylate, trimethylolpropane di(meth)acrylate, pentaerythritol tri(meth)acrylate, dipentaerythritol penta(meth)acrylate, pentaerythritol hexa(meth)acrylate, dipentaerythritol hexa(meth)acrylate, glycerol di(meth)acrylate, t-hydrofurfuryl (meth)acrylate, isodecyl (meth)acrylate, 2-(2-ethoxyethoxy) ethyl (meth)acrylate, stearyl (meth)acrylate, lauryl (meth) acrylate, 2-phenoxyethyl (meth)acrylate, isobonyl (meth) acrylate, tridecyl (meth)acrylate, ethoxylated nonylphenol (meth)acrylate, ethyleneglycol di(meth)acrylate, diethyleneglycol di(meth)acrylate, triethyleneglycol di(meth)acrylate, t-ethyleneglycol di(meth)acrylate, polyethyleneglycol di(meth)acrylate, 1,3-butyleneglycol di(meth)acrylate, tripropyleneglycol di(meth)acrylate, ethoxylated bisphenol A di(meth)acrylate, cyclohexanedimethanol di(meth)acrylate, phenoxy-t-glycol (meth)acrylate, 2-methacryloyloxyethyl phosphate, dimethylol tricyclodecane di(meth)acrylate, trimethylol-propanebenzoate acrylate, fluorene (meth)acrylate, acid phosphoxyethyl methacrylate, etc.

The (meth)acrylate monomer may also include, e.g., fluorene (meth)acrylate monomers having a fluorene structure represented by Chemical Formula 1, above. In particular, the (meth)acrylate monomer may include a fluorene moiety having a structure represented by Chemical Formula 1. The fluorene (meth)acrylate monomer may include, e.g., a fluorene epoxy (meth)acrylate monomer, a fluorene urethane (meth) acrylate monomer, etc. In an implementation, the fluorene (meth)acrylate monomer may be, e.g., a bis(phenoxyethanol) fluorene diacrylate such as BPEF-A (Osaka Gas Co., Ltd.).

The compound with the (meth)acrylate group may be included in the composition in an amount of about 9 to about 16 parts by weight with respect to 100 parts by weight of the binder resin. Maintaining the amount at about 9 parts by weight or greater may help ensure sufficient adhesion at a high pressing temperature. Maintaining the amount at about 16 parts by weight or less may help ensure sufficient curing at a low pressing temperature and sufficient connection reliability.

Organic Peroxide

The organic peroxide may be a polymerization initiator, which serves as a curing agent generating free radicals by heat or light. The organic peroxide may include, e.g., t-butylperoxylaurate, 1,1,3,3-t-methylbutyl peroxy-2-ethylhexanonate, 2,5-dimethyl-2,5-di(2-ethylhexanoyl peroxy)hexane, 1-cyclohexyl-1-methylethyl peroxy-2-ethylhexanonate, 2,5-dimethyl-2,5-di(m-toluoylperoxy)hexane, t-butyl peroxyisopropylmonocarbonate, t-butyl peroxy-2-ethylhexylmonocarbonate, t-hexyl peroxybenzoate, t-butyl peroxyacetate, dicumyl peroxide, 2,5-dimethyl-2,5-di(t-butylperoxy)hexane, t-butylcumylperoxide, t-hexyl peroxyneodecanoate, t-hexylperoxy-2-ethylhexanonate, t-butylperoxy-2-2-ethylhexanonate, t-butylperoxyisobutyrate, 1,1-bis(t-butylperoxy)cyclohexane, t-hexyl peroxyisopropylmonocarbonate, t-butylperoxy-3,5,5-trimethylhexanonate, t-butylperoxypivalate, cumylperoxy-neodecanoate, diisopropylbenzenehydroperoxide, cumene hydroperoxide, isobutylperoxide, 2,4-dichlorobenzoylperoxide, 3,5,5-trimethylhexanoylperoxide, octanoylperoxide, lauroylperoxide, stearoylperoxide, succinic peroxide, benzoylperoxide, 3,5,5-trimethylhexanoylperoxide, benzoylperoxytoluene, 1,1,3,3-tetramethylbutylperoxyneodecanoate, 1-cyclohexyl-1-methylethylperoxyneodecanoate, di-n-propylperoxydicarbonate, diiso-propylperoxycarbonate, bis(4-t-butylcyclohexyl) peroxydicarbonate, di-2-ethoxymethoxyperoxydicarbonate, di(2-ethylhexylperoxy)dicarbonate, dimethoxy-butylperoxydicarbonate, di(3-methyl-3-methoxybutylperoxy)dicarbonate, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-(t-butylperoxy)cyclododecane, 2,2-bis(t-butylperoxy)decane, t-butyltrimethylsilylperoxide, bis(t-butyl)dimethylsilylperoxide, t-butyltriallylsilylperoxide, bis(t-butyl)diallylsilylperoxide, tris(t-butyl)allylsilylperoxide, etc.

In an implementation, an organic peroxide having, e.g., a half-life temperature of about 5 hours to about 15 hours at about 40 to about 100° C. may be used. Maintaining a high half-life temperature that is not too low may help ensure that the decomposition rate does not cause difficulties in storage at normal temperature. Maintaining a half-life temperature that is not too high may help ensure that a polymerization rate is not too slow, thus ensuring quick curing.

The organic peroxide may be included in the composition in an amount of about 1.5 to about 15 parts by weight with respect to 100 parts by weight of the binder resin. Maintaining the amount at about 1.5 parts by weight or greater may help ensure that curing rate is not lowered, thereby maintaining characteristics of main pressing. Maintaining the amount at about 15 parts by weight or less may help ensure that the circuit connection film is able to be removed completely during re-working of an anisotropic conductive film after the film is cured by heating.

According to an embodiment, the composition of the circuit connection film for a semiconductor device may further include conductive particles, as needed. The conductive particles may be employed as a filler to impart conductive capability to the composition of the circuit connection film.

The conductive particles may include, e.g., metal particles including Au, Ag, Ni, Cu, and/or solder; carbon; and a resin including polyethylene, polypropylene, polyester, polystyrene and polyvinyl alcohol and a modification thereof, which may be coated with metal including, e.g., Au, Ag, and/or Ni. The metal may be further coated with frangible insulating material. In other words, the frangible insulating material may be removed from the metal.

The conductive particles may have a particle size of about 2 to about 30 μm, depending on a pitch of a circuit. The conductive particles may be included in the composition in an amount of about 5 to about 13 parts by weight with respect to the 100 parts by weight of the binder resin. Maintaining the amount at about 5 parts by weight or greater may help ensure that a connection area does not decrease if terminals are misaligned during connection, thus ensuring a sufficient connection. Maintaining the amount at about 13 parts by weight or less may help ensure that insulation defects do not easily occur.

Hereinafter, the embodiments will be described in detail with reference to illustrative examples and comparative examples. However, it should be noted that the examples are given by way of illustration only and do not limit the scope. Embodiments provide a circuit connection film formed of the composition for the circuit connection film.

Any suitable device or equipment may be used for forming the circuit connection film. In an implementation, the film may be formed through the following process. The binder resin may be dissolved in an organic solvent and liquidized, and then the remaining ingredients may be added thereto and stirred for a predetermined time. The product may be applied to a release film with a thickness of about 10 to about 50 μm and dried over a predetermined time to volatize the organic solvent, thereby producing a circuit connection film with a single layer structure. The organic solvent may include, e.g., any suitable organic solvents generally used in the art. In an implementation, the foregoing process may be repeated at least twice, thereby preparing a circuit connection film with a multilayer structure, e.g., at least two layers.

In the following Examples 1 to 5 and Comparative Examples 1 to 3, compositions for a circuit connection film were prepared according to compositions given in Table 1, below.

TABLE 1

| | | | E1 | E2 | E3 | E4 | E5 | CE1 | CE2 | CE3 |
|---|---|---|---|---|---|---|---|---|---|---|
| Binder Resin (A) | Acrylate Modified Urethane Resin (i) | (1) Polyurethane Acrylate (wt. %) | 35 | 32.7 | 28.6 | 33.8 | 34.8 | 35.7 | — | 20.7 |
| | | (2) Polyurethane Acrylate (wt. %) | 40.5 | 45.8 | 35.7 | 38.3 | 43.5 | 42.9 | 19.1 | 31 |
| | Carboxyl Modified Acrylonitrile Butadiene Rubber (ii) | Carboxyl Modified Acrylonitrile Butadiene Rubber (wt. %) | 10.5 | 6.5 | 14.3 | 19.1 | 6.2 | 21.4 | 51.5 | 8.6 |
| | Acrylic Copolymer (iii) | Acrylic Copolymer (wt. %) | 14 | 15 | 21.4 | 8.8 | 15.5 | — | 29.4 | 33.4 |
| Radical Polymerizable Compound (B) | Isocyanuric Acid Acrylate Compound (i) | Isocyanuric Acid Ethylene Oxide Modified Diacrylate (parts by weight) | 11.2 | 6.5 | 20 | 12.5 | 7.5 | — | 23.5 | 17.2 |
| | Compound with (Meth)acrylate Group (ii) | (1) Bisphenol A Propyleneoxide Modified Diacrylate (parts by weight) | 15.4 | 14.4 | 5.7 | 19.1 | 14.9 | 28.6 | 11.8 | 22.4 |
| | | (2) Acid Phosphoxyethyl Methacrylate (parts by weight) | 1.4 | 1.3 | 1.4 | 1.5 | 0.6 | 5.7 | 0.7 | 3.4 |
| Organic Peroxide (C) | | (1) Lauroylperoxide (parts by weight) | 1.4 | 1.3 | 2.1 | 1.5 | 1.2 | 2.1 | 1.5 | 2.6 |
| | | (2) Solid Benzoylperoxide (parts by weight) | 0.7 | 0.7 | 0.7 | 0.7 | 0.6 | 0.7 | 0.7 | 0.9 |
| Conductive Particles (D) | | Nickel Powder (parts by weight) | 9.8 | 6.5 | 12.9 | 11.8 | 8.7 | 5.7 | 5.9 | 13.8 |

(A) Binder Resin
(i) Acrylate Modified Urethane Resin:
(1) Polyurethane Acrylate (Weight-average molecular weight: 25,000) was synthesized by polyaddition of polyol (content: 60%), hydroxymethacrylate, and isocyanate (mole ratio of hydroxymethacrylate to isocyanate: 0.5) with methyl ethyl ketone (50% by volume (vol. %)) as a solvent at 90° C. and a pressure of 1 atm. for 5 hours in the presence of dibutyltin dilaurate as a catalyst.
(2) Polyurethane Acrylate (Weight-average molecular weight: 28,000) was synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst.
(ii) Carboxyl Modified Acrylonitrile Butadiene Rubber (Weight-average molecular weight: 240,000, Nipol NBR, Jeon Chemicals)
(iii) Acrylic Copolymer (Weight-average molecular weight: 120,000, Tg: 90° C., Acid value: 1 to 4 mg KOH/g, AOF7001, Aekyung Chemical Co., Ltd.)
(B) Curing Agent
(i) Isocyanuric Acid Ethylene Oxide Modified Diacrylate having a DSC heating peak of 85 to 95° C.
(ii) Compound with (Meth)acrylate Group
(1) Bisphenol A Propyleneoxide Modified Diacrylate (Weight-average molecular weight: 1,000)
(2) Acid Phosphoxyethyl Methacrylate
(C) Organic Peroxide:
(1) Lauroylperoxide (solid dissolved in toluene (10%))
(2) Benzoylperoxide (solid dissolved in toluene (10%))
(D) Conductive Particle: Nickel Powder with Average Particle Size of 5 to 6 μm Example 1 (E1)

A composition for a circuit connection film was obtained by mixing 100 parts by weight of a binder resin with 11.2 parts by weight of isocyanuric acid ethylene oxide modified diacrylate having a DSC heating peak of 85 to 95° C., 15.4 parts by weight of bisphenol A propyleneoxide modified diacrylate (weight-average molecular weight: 1,000), 1.4 parts by weight of acid phosphoxyethyl methacrylate, 1.4 parts by weight of solid lauroylperoxide dissolved in toluene (10%), 0.7 parts by weight of solid benzoylperoxide dissolved in toluene (10%), and 9.8 parts by weight of nickel powder having an average particle size of 5 to 6 μm. The binder resin contains: 35 wt. % polyurethane acrylate (weight-average molecular weight: 25,000), synthesized by polyaddition of polyol (content: 60%), hydroxymethacrylate and isocyanate (mole ratio of hydroxymethacrylate to isocyanate: 0.5) with methyl ethyl ketone (50 vol. %) as a solvent at 90° C. and a pressure of 1 atm. for 5 hours in the presence of dibutyltin dilaurate as a catalyst; 40.5 wt. % polyurethane acrylate (weight-average molecular weight: 28,000), synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst; 10.5 wt. % carboxyl modified acrylonitrile butadiene rubber (weight-average molecular weight: 240,000, Nipol NBR, Jeon Chemicals); and 14 wt. % of an acrylic copolymer (weight-average molecular weight: 120,000, Tg: 90° C., acid value: 1 to 4 mg KOH/g, AOF7001, Aekyung Chemical Co., Ltd.).

Example 2 (E2)

A composition for a circuit connection film was obtained by mixing 100 parts by weight of a binder resin with 6.5 parts by weight of isocyanuric acid ethylene oxide modified diacrylate having a DSC heating peak of 85 to 95° C., 14.4 parts by weight of bisphenol A propyleneoxide modified diacrylate (weight-average molecular weight: 1,000), 1.3 parts by weight of acid phosphoxyethyl methacrylate, 1.3 parts by weight of solid lauroylperoxide dissolved in toluene (10%), 0.7 parts by weight of solid benzoylperoxide dissolved in toluene (10%), and 6.5 parts by weight of nickel powder having an average particle size of 5 to 6 μm. The binder resin contains: 32.7 wt. % polyurethane acrylate (weight-average molecular weight: 25,000), synthesized by polyaddition of polyol (content: 60%), hydroxymethacrylate and isocyanate (mole ratio of hydroxymethacrylate to isocyanate: 0.5) with methyl ethyl ketone (50 vol. %) as a solvent at 90° C. and a pressure of 1 atm. for 5 hours in the presence of dibutyltin dilaurate as a catalyst; 45.8 wt. % polyurethane acrylate (weight-average molecular weight: 28,000), synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst; 6.5 wt. % carboxyl modified acrylonitrile butadiene rubber (weight-average molecular weight: 240,000, Nipol NBR, Jeon Chemicals); and 15 wt. % an acrylic copolymer (weight-average molecular weight: 120,000, Tg: 90° C., acid value: 1 to 4 mg KOH/g, AOF7001, Aekyung Chemical Co., Ltd.).

Example 3 (E3)

A composition for a circuit connection film was obtained by mixing 100 parts by weight of a binder resin with 20 parts by weight of isocyanuric acid ethylene oxide modified diacrylate having a DSC heating peak of 85 to 95° C., 5.7 parts by weight of bisphenol A propyleneoxide modified diacrylate (weight-average molecular weight: 1,000), 1.4 parts by weight of acid phosphoxyethyl methacrylate, 2.1 parts by weight of solid lauroylperoxide dissolved in toluene (10%), 0.7 parts by weight of solid benzoylperoxide dissolved in toluene (10%), and 12.9 parts by weight of nickel powder having an average particle size of 5 to 6 μm. The binder resin contains: 28.6 wt. % polyurethane acrylate (weight-average molecular weight: 25,000), synthesized by polyaddition of polyol (content: 60%), hydroxymethacrylate and isocyanate (mole ratio of hydroxymethacrylate to isocyanate: 0.5) with methyl ethyl ketone (50 vol. %) as a solvent at 90° C. and a pressure of 1 atm. for 5 hours in the presence of dibutyltin dilaurate as a catalyst; 35.7 wt. % polyurethane acrylate (weight-average molecular weight: 28,000), synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst; 14.3 wt. % carboxyl modified acrylonitrile butadiene rubber (weight-average molecular weight: 240,000, Nipol NBR, Jeon Chemicals); and 21.4 wt. % an acrylic copolymer (weight-average molecular weight: 120,000, Tg: 90° C., acid value: 1 to 4 mg KOH/g, AOF7001, Aekyung Chemical Co., Ltd.).

Example 4 (E4)

A composition for a circuit connection film was obtained by mixing 100 parts by weight of a binder resin with 12.5 parts by weight of isocyanuric acid ethylene oxide modified diacrylate having a DSC heating peak of 85 to 95° C., 19.1 parts by weight of bisphenol A propyleneoxide modified diacrylate (weight-average molecular weight: 1,000), 1.5 parts by weight of acid phosphoxyethyl methacrylate, 1.5 parts by weight of solid lauroylperoxide dissolved in toluene (10%), 0.7 parts by weight of solid benzoylperoxide dissolved in toluene (10%), and 11.8 parts by weight of nickel powder having an average particle size of 5 to 6 μm. The binder resin contains: 33.8 wt. % polyurethane acrylate (weight-average molecular weight: 25,000), synthesized by polyaddition of polyol (content: 60%), hydroxymethacrylate and isocyanate (mole ratio of hydroxymethacrylate to isocyanate: 0.5) with methyl ethyl ketone (50 vol. %) as a solvent at 90° C. and a pressure of 1 atm. for 5 hours in the presence of dibutyltin dilaurate as a catalyst; 38.3 wt. % polyurethane acrylate (weight-average molecular weight: 28,000), synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst; 19.1 wt. % carboxyl modified acrylonitrile butadiene rubber (weight-average molecular weight: 240,000, Nipol NBR, Jeon Chemicals); and 8.8 wt. % an acrylic copolymer (weight-average molecular weight: 120,000, Tg: 90° C., acid value: 1 to 4 mg KOH/g, AOF7001, Aekyung Chemical Co., Ltd.).

Example 5 (E5)

A composition for a circuit connection film was obtained by mixing 100 parts by weight of a binder resin with 7.5 parts by weight of isocyanuric acid ethylene oxide modified diacrylate having a DSC heating peak of 85 to 95° C., 14.9 parts by weight of bisphenol A propyleneoxide modified diacrylate (weight-average molecular weight: 1,000), 0.6 parts by weight of acid phosphoxyethyl methacrylate, 1.2 parts by weight of solid lauroylperoxide dissolved in toluene (10%), 0.6 parts by weight of solid benzoylperoxide dissolved in toluene (10%), and 8.7 parts by weight of nickel powder having an average particle size of 5 to 6 μm. The binder resin contains: 38.4 wt. % polyurethane acrylate (weight-average molecular weight: 25,000), synthesized by polyaddition of polyol (content: 60%), hydroxymethacrylate and isocyanate (mole ratio of hydroxymethacrylate to isocyanate: 0.5) with methyl ethyl ketone (50 vol. %) as a solvent at 90° C. and a pressure of 1 atm. for 5 hours in the presence of dibutyltin dilaurate as a catalyst; 43.5 wt. % polyurethane acrylate (weight-average molecular weight: 28,000), synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst; 6.2 wt. % carboxyl modified acrylonitrile butadiene rubber (weight-average molecular weight: 240,000, Nipol NBR, Jeon Chemicals); and 15.5 wt. % of an acrylic copolymer (weight-average molecular weight: 120,000, Tg: 90° C., acid value: 1 to 4 mg KOH/g, AOF7001, Aekyung Chemical Co., Ltd.).

Comparative Example 1 (CE1)

A composition for a circuit connection film was obtained by mixing 100 parts by weight of a binder resin with 28.6 parts by weight of bisphenol A propyleneoxide modified diacrylate (weight-average molecular weight: 1,000), 5.7 parts by weight of acid phosphoxyethyl methacrylate, 2.1 parts by weight of solid lauroylperoxide dissolved in toluene (10%), 0.7 parts by weight of solid benzoylperoxide dissolved in toluene (10%), and 5.7 parts by weight of nickel powder having an average particle size of 5 to 6 μm. The binder resin contains: 35.7 wt. % polyurethane acrylate (weight-average molecular weight: 25,000), synthesized by polyaddition of polyol (content: 60%), hydroxymethacrylate and isocyanate (mole ratio of hydroxymethacrylate to isocyanate: 0.5) with methyl ethyl ketone (50 vol. %) as a solvent at 90° C. and a pressure of 1 atm. for 5 hours in the presence of dibutyltin dilaurate as a catalyst; 42.9 wt. % polyurethane acrylate (weight-average molecular weight: 28,000), synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst; and 21.4 wt. % carboxyl modified acrylonitrile butadiene rubber (weight-average molecular weight: 240,000, Nipol NBR, Jeon Chemicals).

Comparative Example 2 (CE2)

A composition for a circuit connection film was obtained by mixing 100 parts by weight of a binder resin with 23.5 parts by weight of isocyanuric acid ethylene oxide modified diacrylate having a DSC heating peak of 85 to 95° C., 11.8 parts by weight of bisphenol A propyleneoxide modified diacrylate (weight-average molecular weight: 1,000), 0.7 parts by weight of acid phosphoxyethyl methacrylate, 1.5 parts by weight of solid lauroylperoxide dissolved in toluene (10%), 0.7 parts by weight of solid benzoylperoxide dissolved in toluene (10%), and 5.9 parts by weight of nickel powder having an average particle size of 5 to 6 μm. The binder resin contains: 19.1 wt. % polyurethane acrylate (weight-average molecular weight: 28,000), synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst; 51.5 wt. % carboxyl modified acrylonitrile butadiene rubber (weight-average molecular weight: 240,000, Nipol NBR, Jeon Chemicals); and 29.4 wt. % of an acrylic copolymer (weight-average molecular weight: 120, 000, Tg: 90° C., acid value: 1 to 4 mg KOH/g, AOF7001, Aekyung Chemical Co., Ltd.).

Comparative Example 3 (CE3)

A composition for a circuit connection film was obtained by mixing 100 parts by weight of a binder resin with 17.2 parts by weight of isocyanuric acid ethylene oxide modified diacrylate having a DSC heating peak of 85 to 95° C., 22.4 parts by weight of bisphenol A propyleneoxide modified diacrylate (weight-average molecular weight: 1,000), 3.4 parts by weight of acid phosphoxyethyl methacrylate, 2.6 parts by weight of solid lauroylperoxide dissolved in toluene (10%), 0.9 parts by weight of solid benzoylperoxide dissolved in toluene (10%), and 13.8 parts by weight of nickel powder having an average particle size of 5 to 6 μm. The binder resin contains: 20.7 wt. % polyurethane acrylate (weight-average molecular weight: 25,000), synthesized by polyaddition of polyol (content: 60%), hydroxymethacrylate and isocyanate (mole ratio of hydroxymethacrylate to isocyanate: 0.5) with methyl ethyl ketone (50 vol. %) as a solvent at 90° C. and a pressure of 1 atm. for 5 hours in the presence of dibutyltin dilaurate as a catalyst; 31 wt. % polyurethane acrylate (weight-average molecular weight: 28,000), synthesized by polyaddition of polyol (content: 60%), hydroxymethacrylate and isocyanate (mole ratio of hydroxymethacrylate to isocyanate: 1) with methyl ethyl ketone (50 vol. %) as a solvent at 90° C. and a pressure of 1 atm. for 5 hours in the presence of dibutyltin dilaurate as a catalyst; 8.6 wt. % carboxyl modified acrylonitrile butadiene rubber (weight-average molecular weight: 240,000, Nipol NBR, Jeon Chemicals); and 33.4 wt. % of an acrylic copolymer (weight-average molecular weight: 120,000, Tg: 90° C., acid value: 1 to 4 mg KOH/g, AOF7001, Aekyung Chemical Co., Ltd.).

Results and Analysis

The compositions for a circuit connection film prepared in Examples 1 to 5 and Comparative Examples 1 to 3 were evaluated in terms of circuit connection performance as follows, results of which are given in Table 2, below.

A PCB with a pitch of 200 μm (FR-4, terminal width: 100 μm, distance between terminals: 100 μm, terminal height: 35 μm) and a COF (Kapton, terminal width: 100 μm, distance between terminals: 100 μm, terminal height: 9 μm) were used. Each of the compositions prepared in Examples 1 to 5 and Comparative Examples 1 to 3 was temporarily pressed on a circuit forming part of the PCB at 70° C. and 1 Mpa for one second, after which the release film was removed. Then, the other side of the film on the PCB was put into contact with a circuit terminal of the COF and subjected to main pressing at 150° C. and 2.5 Mpa for 4 seconds and at 190° C. and 2.5 Mpa for 4 seconds.

In order to evaluate circuit connection performance, the circuit connection product was measured using a 2-point probe for contact resistance and by a Universal Testing Machine (UTM) for adhesion at 90° C. For evaluation of connection reliability, the circuit connection product was kept in a high temperature/high humidity chamber maintained at 85° C. and 85% relative humidity for 500 hours to measure contact resistance.

For strength of the film, a UTM (H5KT, Hounsfield) was used to measure tensile strength twice per sample, and calculating an average.

For an ideal circuit connection film, initial adhesion was expected to be about 700 gf/cm or greater; adhesion after a reliability test, about 700 gf/cm or greater; initial contact resistance, about 0.5Ω or less; contact resistance after the reliability test, about 1.0Ω or less; and tensile strength, about 100 gh/mm² or more.

The DSC heating peak temperature of the film was measured as follows. An about 5 mg sample of the film was put in an aluminum pan. Then, using a DSC (Perkin-Elmer Diamond), the temperature was measured by reading temperature from a graph illustrating an energy (dΔQ/dt) which the sample emitted under a temperature range of 50 to 220° C. at a temperature rise rate of 10° C./min. When the temperature increased, a first inflection point was referred to as an onset temperature, the peak on the graph as a peak temperature, and an inflection point at which a curve changed to the shape of an original slope through the peak as an end point temperature.

The acid value of the film was measured as follows. An about 1 to 2 g sample of the film was thoroughly dissolved for several minutes in a flask with 50 g of methyl ethyl ketone (MEK). Then, 5 drops of a phenolphthalein solution, a pH indicator, were added and titration with a potassium hydroxide solution (KOH: 0.1 N) was performed. Here, an endpoint was the point at which color stayed for 30 seconds, and the acid value was calculated with the amount of KOH (ml) used in the titration by the following formula.

Acid Value (mg KOH/g)=5.611×KOH (ml)/amount of circuit connection film (g)

the reliability test under high temperature/high humidity were greater than 1.0Ω, which does not satisfy a desired value. The film according to Comparative Example 2 exhibited a DSC heating peak temperature of 92° C. Accordingly, contact resistance after the reliability test under high temperature/high humidity satisfied a desired value. However, the film according to Comparative Example 2 contained a large amount of isocyanuric acid ethylene oxide modified diacrylate, which caused a decrease in total molecular weight of the composition and an increased acid value. Accordingly, initial adhesion did not satisfy a desired value, e.g., about 700 gf/cm or greater.

A desired acid value of a film is about 5 to about 30 mg KOH/g considering application, adhesion, and connection performance under high temperature/high humidity of a composition. The films according to Examples 1 to 5 exhibited acid values within the desired range. Thus they were secured in liquid stability owing to suitability of the compositions for practical use, had adhesion greater than a target value, and obtained satisfactory connection performance under high temperature/high humidity.

However, since the films according to Comparative Examples 1 to 3 exhibited acid values of greater than 30 mg KOH/g, contact resistance after the reliability test under high temperature/high humidity was high and initial adhesion and

TABLE 2

| | | E1 | E2 | E3 | E4 | E5 | CE1 | CE2 | CE3 |
|---|---|---|---|---|---|---|---|---|---|
| Tensile Strength of ACF | (gf/mm²) | 215 | 182 | 252 | 131 | 208 | 26 | 173 | 205 |
| DSC peak temperature of film | ° C. | 94 | 94 | 93 | 93 | 94 | 115 | 92 | 102 |
| Acid value of film | mg KOH/g | 11.7 | 9.5 | 13.6 | 15.7 | 6.1 | 54.8 | 39.7 | 31.7 |
| 150° C., 4 sec, 2.5 MPa | Initial stage | Adhesion (gf/cm) | 1050 | 980 | 1324 | 987 | 1198 | 750 | 564 | 540 |
| | | Contact Resistance (Ω) | 0.34 | 0.35 | 0.32 | 0.35 | 0.34 | 0.52 | 0.34 | 0.40 |
| | After 500 hrs under high temperature/high humidity conditions | Adhesion (gf/cm) | 1205 | 1120 | 1265 | 1138 | 1360 | 820 | 580 | 572 |
| | | Contact Resistance (Ω) | 0.38 | 0.39 | 0.40 | 0.42 | 0.45 | 2.35 | 0.75 | 1.97 |
| 190° C., 4 sec, 2.5 MPa | Initial stage | Adhesion (gf/cm) | 1346 | 1187 | 1540 | 1243 | 1438 | 635 | 670 | 480 |
| | | Contact Resistance (Ω) | 0.32 | 0.33 | 0.34 | 0.32 | 0.35 | 0.37 | 0.40 | 0.34 |
| | After 500 hrs under high temperature/high humidity conditions | Adhesion (gf/cm) | 1530 | 1230 | 1462 | 1355 | 1580 | 764 | 735 | 689 |
| | | Contact Resistance (Ω) | 0.34 | 0.35 | 0.38 | 0.34 | 0.39 | 3.11 | 0.44 | 1.52 |

As shown in Table 2, the films according to Examples 1 to 5 exhibited an initial adhesion of 700 gf/cm or greater, an adhesion after a reliability test of 700 gf/cm or greater, an initial contact resistance of 0.5Ω or less, a contact resistance after the reliability test of 1.0Ω or less, and a tensile strength of 100 gh/mm² or greater. On the other hand, the films according to Comparative Examples 1 to 3 exhibited initial adhesion, adhesion after a reliability test, initial contact resistance, contact resistance after the reliability test, and tensile strength that did not satisfy at least one of the desired values.

The DSC heating peak temperature of a film is ideally about 92 to about 95° C., to ensure low-temperature/quick curing. The films according to Examples 1 to 5 exhibited DSC heating peak temperatures which were within the desired range.

On the other hand, the films according to Comparative Examples 1 and 3 exhibited DSC heating peak temperatures of 100° C. or greater. Accordingly, contact resistances after adhesion after the reliability test under high temperature/high humidity were low, satisfying desired values. This may be because high acid values result in oxidation of the conductive particles, thereby increasing contact resistance and worsening oxidation on the surface of a circuit connected to the films, decreasing adhesion.

As apparent from the above description, according to an embodiment, the composition for circuit connection films may allow for easy control of fluidity and curability, thereby preventing an undesirable decrease in resin exclusion between upper and lower electrodes even in a fine circuit. Furthermore, the composition may have improved curability, thereby being usable in a low-temperature connection process.

The circuit connection film of an embodiment may have excellent wettability to an adherend, and a high glass transition temperature while providing good initial connection structure and improved adhesion. In particular, the circuit connection film of an embodiment may not become loose in a connection structure, thus avoiding generation of bubbles in the film. Further, the composition of an embodiment includes a novel binder that ensures long-term connection and adhesion reliability under high temperature/high humidity conditions despite repetitious contraction and expansion in a connection structure.

Specifically, since the connection film of an embodiment may be adhesive, the film may be fixed to a connection layer. Thus, the connection film of an embodiment may exhibit superior workability. Further, the connection film of an embodiment may not require excessively high reaction temperatures, thus avoiding difficulty in process control and maintenance of a connection device and deterioration of long-term reliability thereof.

In addition, the connection film of an embodiment may have a reaction rate sufficient that is sufficiently high to avoid differences in rheologic properties between the binder resin and the curing agent, thus avoiding fluidity differences bubbles in the connection layer. Accordingly, long-term reliability may be secured. In addition, the connection film of an embodiment may have a reaction rate sufficiently low to ensure sufficient contact between conductive particles and the circuits, thus guaranteeing good connection reliability.

The connection film of an embodiment may also exhibit advantages when used with polyimide (PI) films constituting a base of a chip-on film (COF). In particular, the PI film may suffer changes resulting from a fine pitch between electrodes and circuits according to the trends toward larger scale and narrower frame of display devices.

A PI film containing inorganic particles of 1.0 μm or more, such as calcium hydrogen phosphate particles, may be used to improve performance. Recently however, PI films not containing particles, or with inorganic particles having a particle size of 0.5 μm or less, have been used. As a result, the surface roughness of the PI film may be decreased, causing a decrease of adhesion and an increase of potential bubble generation in a circuit connection film adhered thereon. The connection film of an embodiment may exhibit superior adhesion to PI films used in COF.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A composition for a circuit connection film, comprising:
  a binder resin including:
    an acrylate modified urethane resin,
    a carboxyl modified acrylonitrile butadiene rubber, and
    an acrylic copolymer, the acrylic copolymer having an acid value of about 1 to about 100 mg KOH/g;
  a radical polymerizable compound including at least one of an isocyanurate acrylate compound and a compound having a (meth)acrylate group; and
  an organic peroxide.

2. The composition as claimed in claim 1, wherein the composition includes:
  100 parts by weight of the binder resin, the binder resin including:
    about 45 to about 75 wt. % of the acrylate modified urethane resin,
    about 5 to about 25 wt. % of the carboxyl modified acrylonitrile butadiene rubber, and
    about 5 to about 30 wt. % of the acrylic copolymer having an acid value of about 1 to about 100 mg KOH/g, all based on the weight of the binder resin;
  about 18 to about 32 parts by weight of the radical polymerizable compound including at least one of the isocyanurate acrylate compound and the compound with a (meth)acrylate group; and
  about 1.5 to about 15 parts by weight of the organic peroxide.

3. The composition as claimed in claim 2, wherein the radical polymerizable compound includes the isocyanurate acrylate compound and the compound with a (meth)acrylate group, a weight ratio of the isocyanurate acrylate compound to the compound with a (meth)acrylate group being about 1:2 to about 2:1.

4. The composition as claimed in claim 1, wherein:
  the acrylate modified urethane resin includes a diisocyanate, a polyol, a diol and an acrylate,
  a mole ratio of a diisocyanate group (NCO) to a hydroxyl group (OH) among the diisocyanate, polyol, and diol is about 1.04 to about 1.6, and
  the acrylate modified urethane resin has a polyol content of about 70% or less.

5. The composition as claimed in claim 1, wherein:
  the acrylate modified urethane resin has a weight-average molecular weight of about 1,000 to about 50,000,
  the acrylate modified urethane resin has at least one acrylate terminal functional group, and
  the acrylate modified urethane resin has a glass transition temperature (Tg) of about 0° C. or higher.

6. The composition as claimed in claim 1, wherein:
  the carboxyl modified acrylonitrile butadiene rubber has a weight-average molecular weight of about 2,000 to about 200,000,
  the carboxyl modified acrylonitrile butadiene rubber has an acrylonitrile content of about 10 to about 60 wt. %, and
  the carboxyl modified acrylonitrile butadiene rubber has a carboxyl content of about 1 to about 20 wt. %.

7. The composition as claimed in claim 1, wherein the radical polymerizable compound includes the isocyanurate acrylate compound, the isocyanurate acrylate compound having a DSC heating peak of about 85 to about 95° C.

8. The composition as claimed in claim 7, wherein the isocyanurate acrylate compound has a DSC heating peak of about 92 to about 95° C.

9. The composition as claimed in claim 1, wherein the isocyanurate acrylate compound includes at least one of isocyanuric acid ethylene oxide modified diacrylate and tris(2-hydroxyethyl)isocyanurate triacrylate.

10. The composition as claimed in claim 1, wherein the radical polymerizable compound includes the compound with a (meth)acrylate group, the compound with a (meth)acrylate group including a (meth)acrylate oligomer and a (meth)acrylate monomer.

11. The composition as claimed in claim 10, wherein the (meth)acrylate oligomer includes at least one of urethane (meth)acrylate, epoxy (meth)acrylate, polyester (meth)acrylate, fluorine (meth)acrylate, fluorene (meth)acrylate, silicon (meth)acrylate, phosphorus (meth)acrylate, maleimide modified (meth)acrylate, and acrylate (methacrylate).

12. The composition as claimed in claim 10, wherein the (meth)acrylate monomer includes at least one of 1,6-hexanediol mono(meth)acrylate, 2-hydroxyethyl (meth)acrylate, 2-hydroxypropyl (meth)acrylate, 2-hydroxybutyl (metha)crylate, 2-hydroxy-3-phenyloxypropyl (meth)acrylate, 1,4-butanediol (meth)acrylate, 2-hydroxyalkyl (meth)acryloyl phosphate, 4-hydroxycyclohexyl (meth)acrylate, neopentylglycol mono(meth)acrylate, trimethylolethane di(meth)acrylate, trimethylolpropane di(meth)acrylate, pentaerythritol tri(meth)acrylate, dipentaerythritol penta(meth)acrylate, pentaerythritol hexa(meth)acrylate, dipentaerythritol hexa(meth)acrylate, glycerol di(meth)acrylate, t-hydrofurfuryl (meth)acrylate, isodecyl (meth)acrylate, 2-(2-ethoxyethoxy)ethyl (meth)acrylate, stearyl (meth)acrylate, lauryl (meth)acrylate, 2-phenoxyethyl (meth)acrylate, isobonyl (meth)acrylate, tridecyl (meth)acrylate, ethoxylated nonylphenol (meth)acrylate, ethyleneglycol di(meth)acrylate, diethyleneglycol di(meth)acrylate, triethyleneglycol di(meth)acrylate, t-ethyleneglycol di(meth)acrylate, polyethyleneglycol di(meth)acrylate, 1,3-butyleneglycol di(meth)acrylate, tripropyleneglycol di(meth)acrylate, ethoxylated bisphenol A di(meth)acrylate, cyclohexanedimethanol di(meth)acrylate, phenoxy-t-glycol (meth)acrylate, 2-methacryloyloxyethyl phosphate, dimethylol tricyclodecane di(meth)acrylate, trimethylol-propanebenzoate acrylate, fluorene (meth)acrylate, and acid phosphoxyethyl methacrylate.

13. The composition as claimed in claim 10, wherein at least one of the (meth)acrylate oligomer and the (meth)acrylate monomer includes at least one of a fluorene epoxy (meth)acrylate and a fluorene urethane (meth)acrylate, the at least one fluorene epoxy (meth)acrylate and fluorene urethane (meth)acrylate having a fluorene structure represented by the following Chemical Formula 1:

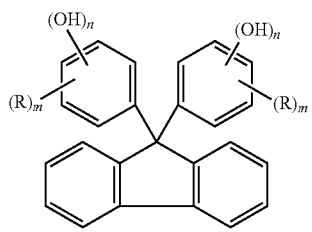

(1)

wherein R is an alkyl, alkoxy, aryl, or cycloalkyl group, m is an integer from 0 to 4, and n is an integer from 2 to 5.

14. The composition as claimed in claim 1, wherein the organic peroxide includes at least one of t-butylperoxylaurate, 1,1,3,3-t-methylbutyl peroxy-2-ethylhexanonate, 2,5-dimethyl-2,5-di(2-ethylhexanoyl peroxy)hexane, 1-cyclohexyl-1-methylethyl peroxy-2-ethylhexanonate, 2,5-dimethyl-2,5-di(m-toluoylperoxy)hexane, t-butyl peroxyisopropylmonocarbonate, t-butyl peroxy-2-ethylhexylmonocarbonate, t-hexyl peroxybenzoate, t-butyl peroxyacetate, dicumyl peroxide, 2,5-dimethyl-2,5-di(t-butylperoxy)hexane, t-butylcumylperoxide, t-hexyl peroxyneodecanoate, t-hexylperoxy-2-ethylhexanonate, t-butylperoxy-2-2-ethylhexanonate, t-butylperoxyisobutyrate, 1,1-bis(t-butylperoxy)cyclohexane, t-hexyl peroxyisopropylmonocarbonate, t-butylperoxy-3,5,5-trimethylhexanonate, t-butylperoxypivalate, cumylperoxy-neodecanoate, diisopropylbenzenehydroperoxide, cumene hydroperoxide, isobutylperoxide, 2,4-dichlorobenzoylperoxide, 3,5,5-trimethylhexanoylperoxide, octanoylperoxide, lauroylperoxide, stearoylperoxide, succinic peroxide, benzoylperoxide, 3,5,5-trimethylhexanoylperoxide, benzoylperoxytoluene, 1,1,3,3-tetramethylbutylperoxyneodecanoate, 1-cyclohexyl-1-methylethylperoxyneodecanoate, di-n-propylperoxydicarbonate, diiso-propylperoxycarbonate, bis(4-t-butylcyclohexyl) peroxydicarbonate, di-2-ethoxymethoxyperoxydicarbonate, di(2-ethylhexylperoxy)dicarbonate, dimethoxy-butylperoxydicarbonate, di(3-methyl-3-methoxybutylperoxy)dicarbonate, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-(t-butylperoxy)cyclododecane, 2,2-bis(t-butylperoxy)decane, t-butyltrimethylsilylperoxide, bis(t-butyl)dimethylsilylperoxide, t-butyltriallylsilylperoxide, bis(t-butyl)diallylsilylperoxide, and tris(t-butyl)allylsilylperoxide.

15. The composition as claimed in claim 1, further comprising:
   about 5 to about 13 parts by weight of conductive particles with respect to 100 parts by weight of the binder resin, the conductive particles including at least one of:
      metal particles including at least one of Au, Ag, Ni, Cu, and solder,
      carbon, and
      a resin including polyethylene, polypropylene, polyester, polystyrene and polyvinyl alcohol and a modification thereof which are coated with metal including at least one of Au, Ag, and Ni.

16. A circuit connection film, comprising:
   the composition as claimed in claim 1, the film having:
      a DSC heating peak temperature of about 92 to about 95° C. when measured by a differential scanning calorimeter (DSC) at a temperature range of 50 to 220° C. and a temperature increase rate of 10° C./min, and
      an acid value of about 5 to about 30 mg KOH/g.

* * * * *